United States Patent Office 3,707,568
Patented Dec. 26, 1972

3,707,568
METHOD FOR PURIFYING CRUDE TRICHLORO-
PHENOL OR HEXACHLOROPHENE
Edwin B. Michaels, Gregory Court, East Norwalk, Conn. 06855, and John W. Lee, Glen Ave., Fairfield, Conn. 06430
No Drawing. Continuation-in-part of application Ser. No. 703,271, Feb. 6, 1968. This application June 9, 1971, Ser. No. 151,605
Int. Cl. C07c 37/22
U.S. Cl. 260—619 A       3 Claims

ABSTRACT OF THE DISCLOSURE

There is provided a method for purifying crude trichlorophenol or hexachlorophene by solubilizing the latter and ammoniating resultant solution to precipitate said salt complex leaving impurities in solution and, thereafter, decomposing the precipitate by heat.

---

This application is a continuation-in-part of our co-pending application, Ser. No. 703,271, filed Feb. 6, 1968, now abandoned.

The present invention relates to a novel process for purifying or refining any crude phenolic compound. More particularly, it relates to the purification of crude 2,4,5-trichlorophenol or bis-(3,5,6-trichloro-2-hydroxyphenyl) methane, hereinafter termed hexachlorophene. Still more particularly, the instant invention is concerned with the purification of crude 2,4,5-trichlorophenol or hexachlorophene by the formation of an ammonium salt complex thereof free from impurities and, thereafter, recovering hexachlorophene from the said complex, by heating the latter complex to remove ammonia therefrom.

As is known, crude phenols, and particularly crude hexachlorophene, are usually purified by several fractional recrystallizations. This is accomplished by forming the alkali metal salt of a crude phenol so as to solubilize the same, usually in an aqueous menstruum, and then precipitating the so-formed phenolic salt either by a change in the solution's pH or by introducing a selective organic meduim in which the alkali metal salt of the phenol is soluble and the impurities present therein are not. For instance, hexachlorophene can be recovered substantially free from impurities by heating impure hexachlorophene with sufficient alkali, such as an aqueous mixture of 2% sodium carbonate and 5% sodium hydroxide to form the disodium salt of hexachlorophene at a pH of about 13.5 to substantially solubilize all the latter disodium salt. Any insolubles present are filtered or otherwise removed from the solution. The pH of the solution is next carefully reduced to a pH of about 10 by the addition of a suitable mineral acid, such as sulfuric acid, so as to obtain the corresponding monosodium phenolic salt which precipitates out of the solution. In this manner, any impurities remain solubilized in the solution. Upon filtration, the precipitated monosodium phenolic salt is separated and acidified to regenerate hexachlorophene. Unfortunately, this method is not wholly satisfactory because it involves (a) difficult control of pH, (b) the use of large amounts of alkali or base and acid and (c) the use of large quantities of water to effect recrystallizations. Another suggested method for obviating the foregoing difficulties is the addition of certain ethers, such as dioxane, to crude hexachlorophene to form a solid ether complex of the same. This procedure avoids the use of large quantities of water. However, the method tends to affect adversely overall yield and requires the use of rather expensive organic solvents. Hence, if an economical and direct method for effecting the purification of crude phenols, and particularly hexachlorophene, can be found, such a method would serve to fulfill a long-felt need in the art.

It has been unexpectedly found that the ammoniation of crude 2,4,5-trichlorophenol or hexachlorophene in a suitably selective solvent solution causes the formation of an insoluble ammonium salt complex of said trichlorophenol or hexachlorophene at a temperature of from about 60° C. to below about 90° C. Surprisingly, the ammonium salt complex possesses minuscule solubility in selective solvents hereinbelow more fully described and, therefore, can be readily purified, since the impurities remain soluble in the aforementioned solvent.

At room temperature, a diammonium salt complex of hexachlorophene, for instance, possesses good stability and is compatible as an additive in various soap and synthetic detergent compositions rendering the latter antibacterial.

According to the present invention, either crude hexachlorophene having a melting point between about 145° C. and about 160° C. or 2,4,5-trichlorophenol having a crystallizing point of about 58° C. is subjected to ammoniation. This is initially accomplished by dissolving a crude trichlorophenol or hexachlorophene to be purified in any suitable selective solvent in which the phenol or bis-phenol in the form of its ammonium salt complex is insoluble, but the impurities present in the crude phenol or bis-phenol are soluble. Illustrative of the latter solvents are, for instance, aromatic solvents, such as benzene, toluene or xylene, or aliphatic solvents, such as petroleum distillates, perchloroethylene or ethylene dichloride and equivalents thereof.

The so-solvent dissolved crude hexachlorophene is next treated with at least two mols of ammonia gas or aqueous ammonium hydroxide or at least one mol of ammonium carbonate per mol of crude hexachlorophene under agitation. An ammonium salt complex which is believed to be the diammonium salt complex forms rapidly and precipitates out of solution and is separated as by filtration or other suitable means. The resultant precipitate is next collected and dried at a temperature between about 90° C. and 135° C. to decompose the ammonium salt complex, whereby purified hexachlorophene is recovered in good yield and purity.

The following examples are presented for purposes of illustration and are not to be construed as limiting the scope of the invention in any way. All parts given are by weight, except as otherwise stated.

EXAMPLE 1

This example illustrates the preparation of hexachlorophene.

To a suitable reaction vessel are added 100 parts of technical grade (93%) 2,4,5-trichlorophenol and 75 parts of acetic acid. The mixture is heated to 80° C. The temperature was next increased to 95° C. for a period of about 30 minutes during which time period 100 parts of oleum or fuming sulfuric acid (20% $SO_3$) under agitation are added. Thereafter, 50 parts of concentrated sulfuric acid are introduced at a temperature between 85° C. and 95° C. so as to further dilute the reaction mixture. To the latter are then gradually added over a one-hour period 8.5 parts of paraformaldehyde. The temperature of the resultant mixture is held at about 90° C. for an additional one and one-half hours. On dilution with 100 parts of water and subsequent filtration, there is recovered crude hexachlorophene having a melting point equal to about 160° C.

EXAMPLE 2

This example illustrates the purification procedure of the present invention.

Twenty-five parts of crude hexachlorophene as prepared in Example 1 above are dissolved in about 100 parts of toluene. The mixture is heated to about 60° C. while adding under agitation 6 parts of ammonium carbonate over a period of 15 minutes. There then results in the mixture a precipitate of an ammonium salt complex which is believed to be the diammonium salt complex of hexachlorophene.

The precipitate is next separated from the above-defined solution and dried at a temperature of from 65° C. to 75° C. to isolate the complex which melts with decomposition at about 175° C. and is soluble in isopropanol, but is insoluble in water and the hereinabove defined aliphatic and aromatic solvents.

The salt complex is heated to about 130° C. to remove all the ammonia from said complex so as to recover 23 parts or 92% yield of purified, substantially white and odorless hexachlorophene having a melting point of from about 163° C. to 167° C.

Similar results are obtained where two equivalents of ammonia gas are employed in lieu of ammonium carbonate.

It is an advantage of the present invention to obtain the resultant ammonium salt complex which, upon heating, results in hexachlorophene per se. The rehandling of the salt complex so as to regenerate hexachlorophene is unnecessary. Mere heating of the ammonium salt complex alone to a temperature between about 90° C. and 135° C. causes ammonium ion to be eliminated from the complex, thereby avoiding multiple solid separations or fractionation operations.

EXAMPLE 3

This example illustrates a prior art procedure.

The procedure of Example 2 is followed in every detail except that ammonia or ammonium carbonate is omitted. Recrystallization of crude hexachlorophene is effected upon heating, subsequent concentration and cooling. Fourteen (14) parts, equivalent to 55% yield, of purified hexachlorophene are then recovered as an off-white powdery product, having a melting point between about 161° C. and 165° C.

Although the overall process of the present invention has hereinabove been defined with respect to hexachlorophene purification, the procedural steps may similarly and advantageously be employed to rapidly purify 2,4,5-trichlorophenol.

EXAMPLE 4

This example illustrates 2,4,5-trichlorophenol purification employing the method of the invention.

To a suitable vessel are introduced 25 parts of crude 2,4,5-trichlorophenol having a crystallizing point of 58° C. and to which are added 100 parts of ethylene dichloride. The mixture is heated to 60° C. Gaseous ammonia is then bubbled into the mixture under agitation at a rate of one equivalent based on the phenol.

A white crystalline precipitate forms and is filtered from the resultant solution. The filtered precipitate, analyzing as an ammonium salt complex, is next heated to 110° C., whereby the solid precipitate is liquefied and ammonia is released. There is finally recovered 20 parts of pure 2,4,5-trichlorophenol, having a crystallizing point of 61.5° C.

We claim:

1. A process for preparing purified hexachlorophene which comprises the steps of: dissolving crude hexachlorophene, derived from the condensation of 2,4,5-trichlorophenol and formaldehyde, in toluene, adding to said solution at a temperature of about 60° C. an ammoniating agent selected from the group consisting of ammonia and ammonium carbonate in an amount sufficient to precipitate a solid complex from said mixture, heating the separated solid complex at a temperature of from about 90° C. to about 135° C. to free ammonia from the complex and thereafter recovering substantially pure hexachlorophene.

2. The process of claim 1 wherein the ammoniating agent is ammonia.

3. The process of claim 1 wherein the ammoniating agent is ammonium carbonate.

References Cited
UNITED STATES PATENTS

| | | | |
|---|---|---|---|
| 2,791,616 | 5/1957 | Luten | 260—619 A |
| 2,959,622 | 11/1960 | Grimme et al. | 260—619 A |

BERNARD HELFIN, Primary Examiner